United States Patent
Weismantel et al.

(10) Patent No.: US 9,505,853 B2
(45) Date of Patent: Nov. 29, 2016

(54) PRODUCTION OF SUPERABSORBENT POLYMERS

(75) Inventors: Matthias Weismantel, Jossgrund-Oberndorf (DE); Rüdiger Funk, Niedernhausen (DE); Leigh R. Blair, Greenwood Springs, MS (US); Kevin D. Heitzhaus, Suffolk, VA (US); Bruce Storey, Chesapeake, VA (US)

(73) Assignee: BASF SE, Ludwigshafen (DE)

( * ) Notice: Subject to any disclaimer, the term of this patent is extended or adjusted under 35 U.S.C. 154(b) by 1156 days.

(21) Appl. No.: 12/521,945

(22) PCT Filed: Jan. 14, 2008

(86) PCT No.: PCT/EP2008/050340
§ 371 (c)(1),
(2), (4) Date: Jul. 1, 2009

(87) PCT Pub. No.: WO2008/087114
PCT Pub. Date: Jul. 24, 2008

(65) Prior Publication Data
US 2010/0041549 A1 Feb. 18, 2010

Related U.S. Application Data

(60) Provisional application No. 60/880,798, filed on Jan. 16, 2007.

(51) Int. Cl.
*B01J 20/26* (2006.01)
*C08F 2/00* (2006.01)
*C08F 220/06* (2006.01)

(52) U.S. Cl.
CPC ............... *C08F 2/00* (2013.01); *C08F 220/06* (2013.01)

(58) Field of Classification Search
CPC ................................. C08F 220/06; C08F 2/00
See application file for complete search history.

(56) References Cited

U.S. PATENT DOCUMENTS

| | | | |
|---|---|---|---|
| 4,192,727 A | 3/1980 | Ward | |
| 4,286,082 A | 8/1981 | Tsubakimoto et al. | |
| 4,857,610 A | 8/1989 | Chmelir et al. | |
| 5,004,761 A | 4/1991 | Yada et al. | |
| 5,124,416 A | 6/1992 | Haruna et al. | |
| 6,241,928 B1 | 6/2001 | Hatsuda et al. | |
| 6,403,700 B1* | 6/2002 | Dahmen et al. | 524/556 |
| 6,565,768 B1 | 5/2003 | Dentler et al. | |
| 6,710,141 B1 | 3/2004 | Heide et al. | |
| 2004/0234607 A1 | 11/2004 | Irie et al. | |
| 2008/0021150 A1* | 1/2008 | Becker et al. | 524/555 |
| 2008/0214749 A1 | 9/2008 | Weismantel et al. | |

FOREIGN PATENT DOCUMENTS

| | | |
|---|---|---|
| DE | 27 37 994 | 3/1978 |
| DE | 38 2 5366 | 2/1989 |
| EP | 0 228 638 | 12/1986 |
| EP | 0 497 623 A2 | 8/1992 |
| EP | 0 955 086 A2 | 11/1999 |
| EP | 1 470 905 | 10/2004 |
| JP | 07270070 A | 10/1995 |
| JP | 11-349687 A | 2/1999 |
| WO | WO-00/22017 A1 | 4/2000 |
| WO | WO01/38402 | 5/2001 |
| WO | WO-02/051346 A1 | 7/2002 |
| WO | WO2006/100300 | 9/2006 |

OTHER PUBLICATIONS

RD 427047 A, Nov. 1999, Derwent, Anonymous.*
Anonymous Research Disclosure #37327dated May 1995 entitled "Method for Distribution of Pasty Materials onto a Continuous Through-Circulation Belt Dryer."
Anonymous Research Disclosure #37441 dated Jun. 1995 entitled "Creating a More Uniform Distribution of Materials on a Continuous Through-Circulation Belt Dryer."
"Commercial Processes for the Manufacture of Superabsorbent Polymers-Solution Polymerization," in *Modern Superabsorbent Polymer Technology*, Bucholz et al. eds., John Wiley & Sons, Inc., pp. 96-103 (1998).
International Search Report in corresponding PCT/EP2008/050340 dated Mar. 4, 2008.
Buchholz, Fredric L., et al.. (eds.). *Modern Superabsorbent Polymer Technology*, "Commercial Processes for the Manufacture of Superabsorbent Polymers," pp. 69, 72-84, 87-93, 171-172. New York: John Wiley & Sons, Inc., 1998.
News of Sanyo Kasei, Performance Chemicals of Active Sanyo Kasei, "Super Absorbent Polymer," No. 394, published in 1999. (Partial translation).
*Research Disclosure*, publication 383063, "Drying of Pasty Materials Using a Continuous Through-Circulation Belt Dryer," Kenneth Mason Publications Ltd., Dudley House, 12 North Street, Emsworth Hampshire PO10 7DQ, England (also available from Emsworth Design Inc., 121 West 19th Street, New York, N.Y. 10011).

* cited by examiner

Primary Examiner — Karuna P Reddy
(74) Attorney, Agent, or Firm — Marshall, Gerstein & Borun LLP

(57) ABSTRACT

The invention relates to the production of superabsorbent polymers comprising conveying a polymer gel having acid groups on an oscillating conveyor belt to a continuous through-circulation belt dryer, wherein the belt speed of the conveyor belt is at least 0.4 m/s.

11 Claims, No Drawings

PRODUCTION OF SUPERABSORBENT POLYMERS

CROSS-REFERENCE TO RELATED APPLICATIONS

This is the U.S. national phase of International Application No. PCT/EP2008/050340, filed Jan. 14, 2008, which claims the benefit of U.S. provisional patent Application No. 60/880,798, filed Jan. 16, 2007, incorporated herein in its entirety by reference.

The present invention relates to the production of superabsorbent polymers comprising conveying a polymer gel having acid groups on a conveyor belt, wherein the belt speed of the conveyor belt is at least 0.4 m/s.

Superabsorbent polymers are in particular polymers of (co)polymerized hydrophilic monomers, graft (co)polymers of one or more hydrophilic monomers on a suitable grafting base, crosslinked ethers of cellulose or of starch, crosslinked carboxymethyl-cellulose, partially crosslinked polyalkylene oxide or natural products swellable in aqueous fluids, such as guar derivatives for example. Such polymers are used as products capable of absorbing aqueous solutions to produce diapers, tampons, sanitary napkins and other hygiene articles, but also as water-retaining agents in market gardening.

Superabsorbent polymers typically have a Centrifuge Retention Capacity in the range from 25 to 60 g/g, preferably of at least 30 g/g, more preferably of at least 32 g/g, even more preferably of at least 34 g/g and most preferably of at least 35 g/g. Centrifuge Retention Capacity (CRC) is determined by EDANA (European Disposables and Nonwovens Association) recommended test method No. WSP 241.2-05 "Centrifuge retention capacity".

To improve their performance characteristics, for example permeability, superabsorbent polymeric particles are generally postcrosslinked. This postcrosslinking can be carried out in the aqueous gel phase. Preferably, however, dried, ground and screened particles of the base polymer are surface coated with a postcrosslinker, dried and thermally postcrosslinked. Useful crosslinkers for this purpose include compounds comprising at least two groups capable of forming covalent bonds with the carboxylate groups of the superabsorbent polymer particles or capable of crosslinking together carboxyl groups or other functional groups of at least two different polymeric chains of the base polymer.

The production of superabsorbent polymers is described for example in the monograph "Modern Superabsorbent Polymer Technology", F. L. Buchholz and A. T. Graham, Wiley-VCH, 1998, pages 69 to 117.

Kneading reactors or belt reactors are suitable reactors. In a kneader, the polymer gel which is produced in the course of the polymerization of an aqueous monomer solution is for example continuously comminuted by contrarotatory stirring shafts, as described in WO 2001/38402 A1. The polymerization on a belt is described for example in DE 38 25 366 A1 and U.S. Pat. No. 6,241,928. The polymerization in a belt reactor produces a polymer gel which has to be comminuted in a further process step, for example in a meat grinder, extruder or kneader.

Usually, the formed polymer gel is dried on a through-circulation belt dryer. The polymer gel must be evenly distributed on the belt. An uneven distribution results in a decreased product uniformity, losses in product quality and a reduced drying efficiency.

WO 2006/100300 A1 describes the drying of polymer gels on through-circulation belt dryers.

EP 1 470 905 A1 A discloses a process for the production of superabsorbent polymers. In the disclosed process, a oscillating belt conveyor transfers the disintegrated polymer gel from an extruder to a through-circulation belt dryer.

Research Disclosure RD37327 und Research Disclosure RD37440 describe means for distribution of a disintegrated polymer gel on a through-circulation belt dryer.

It is an object of the present invention to provide an improved process for production of superabsorbent polymers.

We have found that this object is achieved by a process for production of superabsorbent polymers comprising i) polymerizing a monomer solution, comprising at least one ethylenically unsaturated acid-functional monomer, ii) conveying the formed polymer gel on a oscillating conveyor belt to a continuous through-circulation belt dryer and iii) drying the polymer gel wherein the belt speed of the conveyor belt is at least 0.4 m/s.

The belt speed of the conveyor belt is preferably at least 0.8 m/s, more preferably at least 1.2 m/s, most preferably at least 1.6 m/s.

In a preferred embodiment of the present invention 60 mol-% or less, more preferably 55 mol-% or less, most preferably 50 mol-% or less, of the acid groups of the at least one ethylenically unsaturated acid-functional monomer are neutralized.

In another preferred embodiment of the present invention the degree of neutralization of the at least one ethylenically unsaturated acid-functional monomer is 40 mol-% or less, more preferably 30 mol-% or less, most preferably 20 mol-% or less, and the degree of neutralization of the formed polymer gel is raised to 50 mol-%, preferably at least 55 mol-%, more preferably at least 60 mol-%, most preferably at least 65 mol-%.

The water content of the polymer gel before drying is preferably from 30 to 80 wt. %, more preferably from 40 to 70 wt. %, most preferably from 50 to 60 wt. %.

The inventors have found that the stickiness of the polymer gel depends on the degree of neutralization and that the stickiness of the polymer gel causes uneven distribution on the dryer belt.

Especially polymer gels having a low degree of neutralization stick on the conveyor belt. A high belt speed results an uniformly release of the sticky polymer gel from the conveyor belt and therefore an uniformly distribution of the polymer gel on the dryer belt.

Surprisingly, a polymer gel formed by neutralization after polymerization (post-neutralization) is more sticky than a polymer gel formed by polymerization of a neutralized monomer solution (pre-neutralization). That means that a post-neutralized polymer gel is more sticky than a pre-neutralized polymer gel having the same degree of neutralization.

The conveyor belt can be made of various materials, although these must meet the requirements of good tensile strength and flexibility, good fatigue strength under repeating bending stresses, good deformability and chemical resistance to the individual reaction components under the conditions of the polymerization.

The mechanical requirements can be satisfied by a carcass of, for example, fabric inserts of natural and/or synthetic fibers or glass fibers or steel cords.

The chemical resistance can be achieved by a cover of, for example, polyethylene, polypropylene, polyisobutylene, halogenated polyolefines such as polyvinyl chloride or polytetrafluroethylene, polyamides, natural or synthetic rubbers, polyester resins or epoxy resins. The preferred cover material is silicone rubber.

The length of the belt conveyor is preferably from 2 to 10 m, more preferably from 4 to 8 m, most preferably from 5 to 7 m.

The width of the conveyor belt is preferably from 0.2 to 1 m, more preferably from 0.4 to 0.8 m, most preferably from 0.5 to 0.7 m.

The maximum inclination of the oscillating belt conveyor is preferably from 10 to 50 degrees, more preferably from 15 to 40 degrees, most preferably from 20 to 30 degrees, based on the conveying direction of the dryer.

The feed height, i.e., the vertical distance between the oscillating conveyor belt and the belt of the continuous through-circulation belt dryer, is preferably from 10 to 200 cm, more preferably from 20 to 120 cm, most preferably from 30 to 40 cm.

The thickness of the polymer gel to be dried on the dryer belt is preferably from 1 to 20 cm, more preferably from 2 to 15 cm, most preferably from 4 to 12 cm.

The belt speed of the dryer belt is preferably from 0.005 to 0.05 m/s, more preferably from 0.01 to 0.03 m/s, most preferably from 0.015 to 0.025 m/s.

The width of the dryer belt is preferably at least 2 m, more preferably at least 3 m, most preferably 4 m.

In a preferred embodiment of the present invention the conveyor belt is coated with at least one surfactant. Examples of useful surfactants are sorbitan monoesters, such as sorbitan monococoate and sorbitan monolaurate, or ethoxylated variants thereof. Very useful surfactants further include the ethoxylated and alkoxylated derivatives of 2-propylheptanol, which are marketed by BASF AG of Germany under the brandnames of Lutensol XL® and Lutensol XP®. The surfactant can be added to the polymer gel. Preferably the surfactant is sprayed on the conveyor belt before loading with the polymer gel.

The monomer solutions usable in the process of the present invention comprises
a) at least one ethylenically unsaturated acid-functional monomer,
b) at least one crosslinker,
c) if appropriate one or more ethylenically and/or allylically unsaturated monomers copolymerizable with a), and
d) if appropriate one or more water-soluble polymers onto which the monomers a), b) and if appropriate c) can be at least partly grafted.

Suitable monomers a) are for example ethylenically unsaturated carboxylic acids, such as acrylic acid, methacrylic acid, maleic acid, fumaric acid and itaconic acid and/or salts of these acids. Acrylic acid and methacrylic acid are particularly preferred monomers. Acrylic acid is most preferable.

Useful monomers a) are further styrenesulfonic acid, 2-acrylamido-2-methylpropane-sulfonic acid and 2-hydroxyethylacrylate.

The proportion of the total amount of monomers a) which is attributable to acrylic acid and/or its salts is preferably at least 50 mol-%, more preferably at least 90 mol-% and most preferably at least 95 mol-%.

The monomers a) and especially acrylic acid comprise preferably up to 0.025% by weight of a hydroquinone half ether. Preferred hydroquinone half ethers are hydroquinone monomethyl ether (MEHQ) and/or tocopherols.

Tocopherol refers to compounds of the following formula:

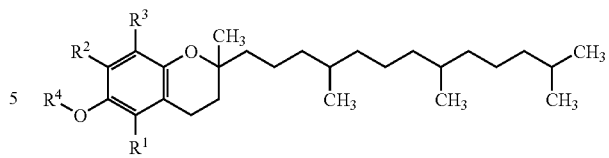

where $R^1$ is hydrogen or methyl, $R^2$ is hydrogen or methyl, $R^3$ is hydrogen or methyl and $R^4$ is hydrogen or an acid radical of 1 to 20 carbon atoms.

Preferred $R^4$ radicals are acetyl, ascorbyl, succinyl, nicotinyl and other physiologically tolerable carboxylic acids. The carboxylic acids can be mono-, di- or tricarboxylic acids.

Preference is given to alpha-tocopherol where $R^1=R^2=R^3$=methyl, especially racemic alpha-tocopherol. $R^4$ is more preferably hydrogen or acetyl. RRR-alpha-Tocopherol is preferred in particular.

The monomer solution comprises preferably not more than 130 weight ppm, more preferably not more than 70 weight ppm, preferably not less than 10 weight ppm, more preferably not less than 30 weight ppm and especially about 50 weight ppm of hydroquinone half ether, all based on acrylic acid, with acrylic acid salts being arithmetically counted as acrylic acid. For example, the monomer solution can be produced using an acrylic acid having an appropriate hydroquinone half ether content.

The superabsorbent polymers are in a crosslinked state, i.e., the polymerization is carried out in the presence of compounds having two or more polymerizable groups which can be free-radically interpolymerized into the polymer network. Useful crosslinkers b) include for example ethylene glycol dimethacrylate, diethylene glycol diacrylate, allyl methacrylate, trimethylolpropane triacrylate, triallylamine, tetraallyloxyethane as described in EP 530 438 A1, di- and triacrylates as described in EP 547 847 A1, EP 559 476 A1, EP 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures as described for example in DE 195 43 368 A1, DE 196 46 484 A1, WO 90/15830 A1 and WO 2002/32962 A2.

Useful crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl(meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP 343 427 A2. Useful crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention utilizes di(meth)acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, especially di- and triacrylates of 2- to 6-tuply ethoxylated glycerol or of 2- to 6-tuply ethoxylated trimethylolpropane, of 3-tuply propoxylated glycerol, of 3-tuply propoxylated trimethylolpropane, and also of 3-tuply mixedly ethoxylated or propoxylated glycerol, of 3-tuply mixedly ethoxylated or propoxylated trimethylolpropane, of 15-tuply ethoxylated glycerol, of 15-tuply ethoxylated trimethylolpropane, of at least 40-tuply ethoxylated glycerol, of at least 40-tuply ethoxylated trimethylolethane and also of at least 40-tuply ethoxylated trimethylolpropane.

Very particularly preferred for use as crosslinkers b) are diacrylated, dimethacrylated, triacrylated or trimethacrylated multiply ethoxylated and/or propoxylated glycerols as described for example in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 weight ppm) in the water-absorbing polymer and the aqueous extracts of water-absorbing polymers produced therewith have an almost unchanged surface tension compared with water at the same temperature (typically not less than 0.068 N/m).

The amount of crosslinker b) is preferably from 0.001 to 10 wt. %, more preferably from 0.01 to 5 wt. % and most preferably from 0.1 to 2 wt. %, all based on monomer a).

Examples of ethylenically unsaturated monomers c) which are copolymerizable with the monomers a) are acrylamide, methacrylamide, crotonamide, dimethylaminoethyl methacrylate, dimethylaminoethyl acrylate, dimethylaminopropyl acrylate, diethylamino-propyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

Water absorbing polymers are typically obtained by addition polymerization of an aqueous monomer solution with or without subsequent comminution of the hydrogel. Suitable methods of making are described in the literature. Water absorbing polymers are obtainable for example by gel polymerization in the batch process or tubular reactor and subsequent comminution in meat grinder, extruder or kneader (EP 445 619 A2, DE 19 846 413 A1)

addition polymerization in kneader with continuous comminution by contrarotatory stirring shafts for example (WO 2001/38402 A1)

addition polymerization on belt and subsequent comminution in meat grinder, extruder or kneader (DE 38 25 366 A1, U.S. Pat. No. 6,241,928)

The reaction is preferably carried out in a kneader as described for example in WO 2001/38402 A1, or on a belt reactor as described for example in EP 955 086 A2.

The solids content of the monomer solution is preferably at least 30 wt. %, more preferably at least 35 wt. %, most preferably at least 40 wt. %. The solids content is the sum of monomer a), crosslinker b), monomer c) and polymer d). The usage of aqueous monomer suspensions with high solids contents is also possible.

The acid groups of the polymer gels obtained are typically in a partially neutralized state, the extent of neutralization preferably being in the range from 20 to 80 mol-%, more preferably in the range from 30 to 70 mol-% and even more preferably in the range from 40 to 60 mol-%, for which the customary neutralizing agents can be used, for example alkali metal hydroxides, alkali metal oxides, alkali metal carbonates or alkali metal bicarbonates and also mixtures thereof. Ammonium salts can also be used instead of alkali metal salts. Sodium and potassium are particularly preferred as alkali metals, but most preference is given to sodium hydroxide, sodium carbonate or sodium bicarbonate and also mixtures thereof.

Neutralization is preferably carried out at the monomer stage. This is customarily accomplished by admixing the neutralizing agent as an aqueous solution, as a melt or else preferably as a solid material. For example, sodium hydroxide having a water fraction of distinctly below 50% by weight can be present as a waxy mass having a melting point above 23° C. In this case, metering as piece goods or melt at elevated temperature is possible.

Neutralization can also be carried out after polymerization, at the polymer gel stage. But it is also possible to neutralize up to 40 mol-%, preferably from 10 to 30 mol-% and more preferably from 15 to 25 mol-% of the acid groups before polymerization by adding a portion of the neutralizing agent to the monomer solution and setting the desired final degree of neutralization only after polymerization, at the polymer gel stage. When the polymer gel is neutralized at least partly after polymerization, the polymer gel is preferably mechanically comminuted, for example by means of a meat grinder, in which case the neutralizing agent can be sprayed, sprinkled or poured on and then carefully mixed in. To this end, the gel mass obtained can be repeatedly grindered for homogenization.

The polymer gel is then dried with a through-circulation belt dryer until the residual moisture content is preferably below 15% by weight and especially below 10% by weight, the water content being determined by EDANA (European Disposables and Nonwovens Association) recommended test method No. WSP 230.2-05 "Moisture content". Selectively, drying can also be carried out using a fluidized bed dryer or a heated plowshare mixer. To obtain particularly white products, it is advantageous to dry this gel by ensuring rapid removal of the evaporating water. To this end, the dryer temperature must be optimized, the air feed and removal has to be policed, and at all times sufficient venting must be ensured. Drying is naturally all the more simple— and the product all the more white—when the solids content of the gel is as high as possible. The solids content of the gel prior to drying is therefore preferably between 30% and 80% by weight. It is particularly advantageous to vent the dryer with nitrogen or some other non-oxidizing inert gas. Selectively, however, simply just the partial pressure of the oxygen can be lowered during drying to prevent oxidative yellowing processes. But in general adequate venting and removal of the water vapor will likewise still lead to an acceptable product. A very short drying time is generally advantageous with regard to color and product quality.

A further important function of drying the gel is the ongoing reduction in the residual monomer content of the superabsorbent. This is because any residual initiator will decompose during drying, leading to any residual monomers becoming interpolymerized. In addition, the evaporating amounts of water will entrain any free water-vapor-volatile monomers still present, such as acrylic acid for example, and thus likewise lower the residual monomer content of the superabsorbent.

The dried polymer gel is then ground and classified, useful grinding apparatus typically including single or multiple stage roll mills, preferably two or three stage roll mills, pin mills, hammer mills or swing mills.

The polymer obtained may subsequently be postcrosslinked. Useful postcrosslinkers are compounds comprising two or more groups capable of forming covalent bonds with the carboxylate groups of the polymers. Useful compounds are for example alkoxysilyl compounds, polyaziridines, polyamines, polyamidoamines, di- or polyglycidyl compounds as described in EP 083 022 A2, EP 543 303 A1 and EP 937 736 A2, polyhydric alcohols as described in DE 33 14 019 A1, DE 35 23 617 A1 and EP 450 922 A2, or β-hydroxyalkylamides as described in DE 102 04 938 A1 and U.S. Pat. No. 6,239,230. It is also possible to use compounds of mixed functionality, such as glycidol, 3-ethyl-3-oxetanemethanol(trimethylolpropaneoxetane), as described in EP1 199 327 A2, aminoethanol, diethanolamine, triethanolamine or compounds which develop a further functionality after the first reaction, such as ethylene oxide, propylene oxide, isobutylene oxide, aziridine, azetidine or oxetane.

Useful postcrosslinkers are further said to include by DE 40 20 780 C1 cyclic carbonates, by DE 198 07 502 A1 2-oxazolidone and its derivatives, such as N-(2-hydroxyethyl)-2-oxazolidone, by DE 198 07 992 A1 bis- and poly-2-oxazolidinones, by DE 198 54 573 A2 2-oxotetrahydro-1,3-oxazine and its derivatives, by DE 198 54 574 A1 N-acyl-2-oxazolidones, by DE 102 04 937 A1 cyclic ureas, by DE 103 34 584 A1 bicyclic amide acetals, by EP1 199 327 A2 oxetanes and cyclic ureas and by WO 2003/31482 A1 morpholine-2,3-dione and its derivatives.

Preferred postcrosslinkers are oxazolidone and its derivatives, in particular N-(2-hydroxyethyl)-2-oxazolidone, glycidyl compounds, in particular ethylene glycol diglycidyl ether, polyols, in particular glycerol, and ethylene carbonate.

The amount of postcrosslinker is preferably in the range from 0.001% to 5% by weight, more preferably in the range from 0.01% to 2.5% by weight and most preferably in the range from 0.1% to 1% by weight, all based on the polymer.

Postcrosslinking is customarily carried out by spraying the polymer gel or the dry polymeric particles with a solution, preferably an aqueous solution, of the postcrosslinker. Spraying is followed by thermal drying, and the postcrosslinking reaction can take place not only before but also during drying.

The postcrosslinker is advantageously mixed with the polymer by the process of the present invention and subsequently thermally dried.

Contact dryers are preferable, shovel dryers more preferable and disk dryers most preferable as apparatus in which thermal drying is carried out. Suitable dryers include for example Bepex® dryers and Nara® dryers. Fluidized bed dryers can be used as well.

Drying can take place in the mixer itself, by heating the shell or blowing warm air into it. It is similarly possible to use a downstream dryer, for example a tray dryer, a rotary tube oven or a heatable screw. But it is also possible for example to utilize an azeotropic distillation as a drying process.

Preferred drying temperatures range from 50 to 250° C., preferably from 50 to 200° C., and more preferably from 50 to 150° C. The preferred residence time at this temperature in the reaction mixer or dryer is below 30 minutes and more preferably below 10 minutes.

The present invention provides a process for production of superabsorbent polymers with an improved distribution of the polymer gel on the dryer belt without the need of additional equipment or release agents.

EXAMPLES

Example 1

Comparative Example

A mixture of acrylic acid, crosslinker, water and polymerization initiators was polymerized on a continuous belt reactor. The formed polymer gel was neutralized with soda. The neutralized polymer gel was transferred on the belt of a through-circulation belt dryer using an oscillating belt conveyor. The water content of the polymer gel was 55 wt. % and 72 mol-% of the acid groups of the polymer gel were neutralized.

The belt speed of the conveyor belt was 0.3 m/s. Parts of the polymer gel did not release from the conveyor belt at the end of the oscillating belt conveyor.

Example 2

Inventive Example

Example 1 was repeated, but the belt speed of the conveyor belt was 1.8 m/s. The polymer gel released completely from the conveyor belt at the end of the oscillating belt conveyor.

We claim:
1. A process for production of superabsorbent polymers comprising
   i) polymerizing a monomer solution in a polymerization reactor to form a polymer gel, the monomer solution comprising at least one ethylenically unsaturated acid-functional monomer,
   ii) conveying the formed polymer gel on an oscillating conveyor belt having a belt speed of at least 0.8 m/s and transferring the formed polymer to a continuous through-circulation belt dryer, and
   iii) drying the polymer gel on the continuous through-circulation belt dryer wherein a water content of the polymer gel before drying is at least 30 wt. %.

2. The process according to claim 1 wherein 60 mol-% or less of the acid groups of the at least one ethylenically unsaturated acid-functional monomer are neutralized.

3. The process according to claim 1 wherein 40 mol-% or less of the acid groups of the at least one ethylenically unsaturated acid-functional monomer are neutralized and the degree of neutralization of the formed polymer gel is raised to at least 50 mol-%.

4. The process according to claim 1 wherein the polymerization reactor is a continuous belt reactor.

5. The process according to claim 1 wherein the polymerization reactor is a continuous kneader.

6. The process according to claim 1 wherein a width of the continuous through-circulation belt dryer is at least 2 m.

7. The process according to claim 1 wherein the monomer is at least 50 wt. % acrylic acid.

8. The process according to claim 1 further comprising classifying of the dried polymer gel.

9. The process according to claim 8 further comprising surface crosslinking of the classified polymer gel.

10. The process according to claim 1 wherein the belt speed of the oscillating conveyor belt is at least 1.2 m/s.

11. The process according to claim 1 wherein the belt speed of the oscillating conveyor belt is at least 1.6 m/s.

* * * * *